United States Patent
Kwon et al.

(10) Patent No.: US 9,318,771 B2
(45) Date of Patent: *Apr. 19, 2016

(54) ELECTROLYTE FOR ELECTROCHEMICAL DEVICE, METHOD FOR PREPARING THE ELECTROLYTE AND ELECTROCHEMICAL DEVICE INCLUDING THE ELECTROLYTE

(71) Applicant: LG Chem, Ltd., Seoul (KR)

(72) Inventors: Yo-Han Kwon, Daejeon (KR); Je-Young Kim, Daejeon (KR); Sang-Young Lee, Gangwon-Do (KR); Byung-Hun Oh, Daejeon (KR); Ki-Tae Kim, Daejeon (KR); Hyo-Jeong Ha, Gyeonggi-do (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,641

(22) Filed: Aug. 14, 2015

(65) Prior Publication Data

US 2015/0357676 A1 Dec. 10, 2015

Related U.S. Application Data

(60) Division of application No. 13/353,690, filed on Jan. 19, 2012, now Pat. No. 9,142,855, which is a continuation of application No. PCT/KR2011/004337, filed on Jun. 14, 2011.

(30) Foreign Application Priority Data

Jun. 14, 2010 (KR) .................. 10-2010-0056062
Jun. 14, 2011 (KR) .................. 10-2011-0057343

(51) Int. Cl.
| | |
|---|---|
| *H01M 10/056* | (2010.01) |
| *H01M 10/052* | (2010.01) |
| *C08J 5/22* | (2006.01) |
| *H01M 10/0565* | (2010.01) |
| *C08F 220/18* | (2006.01) |
| *C08F 222/10* | (2006.01) |
| *C08K 3/38* | (2006.01) |
| *C08K 5/315* | (2006.01) |
| *C08K 5/43* | (2006.01) |

(52) U.S. Cl.
CPC ........... *H01M 10/052* (2013.01); *C08F 220/18* (2013.01); *C08J 5/22* (2013.01); *C08J 5/2231* (2013.01); *H01M 10/0565* (2013.01); *C08F 222/1006* (2013.01); *C08J 2379/08* (2013.01); *C08K 3/38* (2013.01); *C08K 5/315* (2013.01); *C08K 5/43* (2013.01); *H01M 2300/0082* (2013.01); *H01M 2300/0085* (2013.01); *Y02E 60/122* (2013.01)

(58) Field of Classification Search
CPC ................................................... H01M 10/056
See application file for complete search history.

(56) References Cited

U.S. PATENT DOCUMENTS

| 4,792,504 A | 12/1988 | Schwab et al. |
|---|---|---|
| 6,284,412 B1 | 9/2001 | Minakata et al. |
| 2002/0132169 A1* | 9/2002 | Yamamoto ............. H01B 1/122 429/317 |
| 2004/0018431 A1 | 1/2004 | Gozdz et al. |
| 2007/0172739 A1 | 7/2007 | Visco et al. |
| 2009/0291353 A1 | 11/2009 | Affinito et al. |

FOREIGN PATENT DOCUMENTS

| CA | 2435218 A1 | 1/2005 |
|---|---|---|
| JP | 1-294768 A | 11/1989 |
| JP | 2000-011757 A | 1/2000 |
| JP | 2000-331712 A | 11/2000 |
| JP | 2009-301833 A | 12/2009 |
| KR | 2008-0033421 A | 4/2008 |
| KR | 20080034219 A | 4/2008 |
| WO | 97/18596 A1 | 5/1997 |
| WO | 2007012174 A1 | 2/2007 |

OTHER PUBLICATIONS

Armand et al "Plastic Crystal-Lithium Batteries: An Effective Ambient Temperature All-Solid-State Power Source" Journal of The Electrochemical Society, 2004, 151, (7), A1028-A1031.*

Abouimrane et al., "Plastic Crystal-Lithium Batteries: An Effective Ambient Temperature All-Solid-State Power Source", Journal of The Electrochemical Society, 151 (7) A1028-A1031 (2004).

Li-Zhen Fan, et al, Composite effects in poly(ethylene oxide)-succinonitrile based all-sold electrolytes, Electrochemistry Communications, Nov. 2006, vol. 8/No. 11, pp. 1753-1756.

Hyo-Jeong Ha et al., "A slef-standing, UV-cured polymer networks-reinforced plastic crystal composite electrolyte for a lithium-ion battery," Electrochimica Acta, Elsevier Science Publishers, Barking, GB, vol. 57, Mar. 24, 2011, pp. 40-45.

Patel, Monalisa, et al., "Plastic-polymer composite electrolytes: Novel soft matter electrolytes for rechargeable lithium batteries," Electrochemistry Communications, vol. 10, pp. 1912-15, Oct. 14, 2008.

\* cited by examiner

*Primary Examiner* — Patrick Ryan
*Assistant Examiner* — Alex Usyatinsky
(74) *Attorney, Agent, or Firm* — Lerner, David, Littenberg, Krumholz & Mentlik, LLP

(57) ABSTRACT

Disclosed is an electrolyte for an electrochemical device. The electrolyte includes a composite of a plastic crystal matrix electrolyte doped with an ionic salt and a crosslinked polymer structure. The electrolyte has high ionic conductivity comparable to that of a liquid electrolyte due to the use of the plastic crystal, and high mechanical strength comparable to that of a solid electrolyte due to the introduction of the crosslinked polymer structure. Further disclosed is a method for preparing the electrolyte. The method does not essentially require the use of a solvent. Therefore, the electrolyte can be prepared in a simple manner by the method. The electrolyte is suitable for use in a cable-type battery whose shape is easy to change due to its high ionic conductivity and high mechanical strength.

7 Claims, 2 Drawing Sheets

ELECTROLYTE FOR ELECTROCHEMICAL DEVICE, METHOD FOR PREPARING THE ELECTROLYTE AND ELECTROCHEMICAL DEVICE INCLUDING THE ELECTROLYTE

CROSS-REFERENCE TO RELATED APPLICATION

The present application is a divisional of U.S. patent application Ser. No. 13/353,690, now U.S. Pat. No. 9,142,855, filed Jan. 19, 2012 which is a continuation of International Application No. PCT/KR2011/004337 filed on Jun. 14, 2011, which claims priority under 35 USC 119(a) to Korean Patent Application Nos. 10-2010-0056062 and 10-2011-0057343 filed in the Republic of Korea on Jun. 14, 2010 and Jun. 14, 2011, respectively, the entire contents of which are incorporated herein by reference.

TECHNICAL FIELD

The present disclosure relates to an electrolyte for an electrochemical device, a method for preparing the electrolyte, and an electrochemical device including the electrolyte.

BACKGROUND ART

Secondary batteries, being the most representative of the electrochemical devices, are devices which convert external electrical energy to chemical energy, store the electrical energy and generate electricity from the chemical energy when necessary. Secondary batteries, or "rechargeable batteries", are designed to be recharged and used multiple times. Lead-acid batteries, nickel cadmium (NiCd) batteries, nickel hydrogen (NiMH) batteries, lithium ion batteries and lithium ion polymer batteries are frequently used as secondary batteries. Secondary batteries have lower costs of use and environmental impact than disposable primary batteries.

Secondary batteries are currently used in places where low power is needed, for example, devices for assisting the start up of car engines, portable devices, instruments and uninterrupted power supply systems. The recent developments in wireless communication technologies have led to the popularization of portable devices and have brought about a tendency for devices to connect to wireless networks. As a result, the demand for secondary batteries is growing explosively. In addition, hybrid vehicles and electric vehicles have been put into practical use to prevent environmental pollution, and by using secondary batteries in these next-generation vehicles, they reduce the weight and cost and extend battery life for long-term use.

Generally, most secondary batteries are cylindrical, prismatic or pouch type in shape because of their fabrication process. That is, a secondary battery is typically fabricated by inserting an electrode assembly composed of an anode, a cathode and a separator into a cylindrical or prismatic metal can or a pouch type case made of an aluminum laminate sheet, and injecting an electrolyte into the electrode assembly. Accordingly, the cylindrical, prismatic or pouch type secondary battery essentially requires a certain space for assembly, which is an obstacle to the development of various types of portable devices. Thus, there is a need for a novel type of secondary battery whose shape is easy to change, and particularly, an electrolyte that has high ionic conductivity without any risk of leakage.

Ionically conductive organic electrolytes predominantly used for conventional electrochemical devices based on electrochemical reactions are in the form of liquids in which salts are dissolved in non-aqueous organic solvents. However, the use of such electrolytes in the form of liquids causes degradation of electrode materials, increases the possibility of evaporation of organic solvents, and poses safety problems, such as fire and explosion resulting from high surrounding temperatures and increased battery temperatures. A risk of leakage and difficulty in realizing various types of electrochemical devices are additional safety problems. In attempts to overcome the safety problems of such liquid electrolytes, polymer electrolytes, such as gel polymer electrolytes and solid polymer electrolytes have been proposed. It is generally known that the safety of electrochemical devices increases in the order of liquid electrolytes, gel polymer electrolytes and solid polymer electrolytes, but the performance thereof decreases in the same order. It is known that electrochemical devices employing solid polymer electrolytes are not yet commercialized due to these inferior performances. Gel polymer electrolytes have low ionic conductivity, suffer from the risk of leakage and possess poor mechanical properties compared to liquid electrolytes.

Korean Unexamined Patent Publication No. 2008-33421 discloses an electrolyte using a plastic crystal matrix instead of using a liquid organic solvent. The electrolyte exhibits ionic conductivity comparable to that of a liquid electrolyte. However, the electrolyte exhibits very poor mechanical properties due to its flowability similar to that of liquid. In actuality, a separator is required to prevent short circuits in a battery using the electrolyte. In some cases, the introduction of linear polymer matrices, such as polyethylene oxide, is considered to improve the mechanical strength of plastic crystal matrix electrolytes. However, even in these cases, the electrolytes do not possess mechanical properties sufficient enough to replace the use of separators and because solvents are used, there exists a problem of having to add an additional drying process.

Thus, there is an urgent need to develop a solid electrolyte using a plastic crystal matrix electrolyte that has improved mechanical properties while maintaining high ionic conductivity of the plastic crystal matrix electrolyte.

DISCLOSURE

Technical Problem

The present disclosure is designed to solve the problems of the prior art, and therefore it is an object of the present disclosure to provide a plastic crystal matrix electrolyte that has high ionic conductivity and can ensure mechanical strength, and a method for preparing the electrolyte.

Technical Solution

According to an aspect of the present disclosure, there is provided an electrolyte for an electrochemical device which includes a composite of a plastic crystal matrix electrolyte doped with an ionic salt and a crosslinked polymer structure.

The plastic crystal matrix may be, for example, succinonitrile.

The ionic salt is preferably a lithium salt. Examples of such lithium salts include lithium bis-trifluoromethanesulfonylimide, lithium bis-perfluoroethylsulfonylimide and lithium tetrafluoroborate.

The crosslinked polymer structure may be obtained by polymerization of a monomer having two or more functional groups. The monomer having two or more functional groups may be selected from trimethylolpropane ethoxylate triacrylate, ethylene glycol dimethacrylate, ethylene glycol diacrylate, trimethylolpropane trimethacrylate, ethoxylated bisphenol A dimethacrylate, and divinyl benzene.

Alternatively, the crosslinked polymer structure may be obtained by copolymerization of the monomer having two or more functional groups and a monomer having one functional group. The monomer having one functional group may be selected from methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride, and vinyl fluoride.

According to another aspect of the present disclosure, there is provided a method for preparing the electrolyte, the method including: adding a monomer having two or more functional groups to a plastic crystal matrix electrolyte doped with an ionic salt to prepare a solution; and polymerizing the monomer in the solution. Optionally, a monomer having one functional group may be further added to the solution.

Advantageous Effects

The electrolyte of the present disclosure has high ionic conductivity comparable to that of a liquid electrolyte due to the use of a plastic crystal, and high mechanical strength comparable to that of a solid electrolyte due to the introduction of a crosslinked polymer structure. In addition, the method of the present disclosure does not essentially require the use of a solvent, eliminating the need for drying. Therefore, the electrolyte of the present disclosure can be prepared in a simple manner. The electrolyte of the present disclosure is suitable for use in a cable-type battery whose shape is easy to change due to its high ionic conductivity and high mechanical strength comparable to that of a solid electrolyte.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

MODE FOR DISCLOSURE

Figure 1:
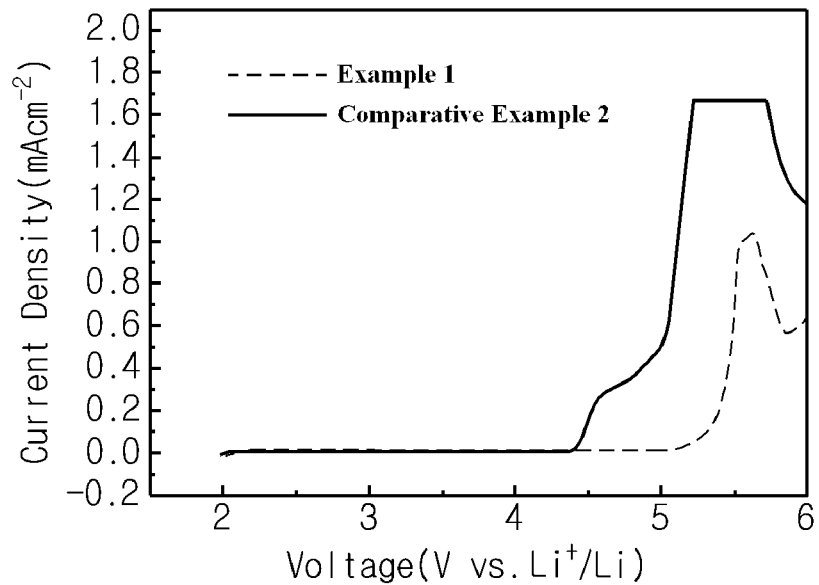
FIG. 1 is a graph showing the electrochemical stability of electrolytes prepared in Example 1 and Comparative Example 2.

Hereinafter, preferred embodiments of the present disclosure will be described in detail with reference to the accompanying drawings. It should be understood that the terms used in the specification and the appended claims should not be construed as being limited to general and dictionary meanings, but interpreted based on the meanings and concepts corresponding to technical aspects of the present disclosure on the basis of the principle that the inventor is allowed to define terms appropriately for the best explanation.

The present disclosure provides an electrolyte for an electrochemical device which includes a composite of a plastic crystal matrix electrolyte doped with an ionic salt and a crosslinked polymer structure.

The electrolyte of the present disclosure serves as a medium that transports lithium ions between a cathode and an anode.

The plastic crystal is a compound whose molecules or ions exhibit rotational disorder but whose center of gravity occupies a position aligned in the crystal lattice structure. The rotational phase of the plastic crystal is generally created by a solid-to-solid transition at a temperature not higher than the melting point. As a result of the solid-to-solid transition, the plastic crystal exhibits high plasticity, mechanical flowability and conductivity. Particularly, the doping with an ionic salt results in high ionic conductivity, making the plastic crystal suitable for use in an electrolyte for a secondary battery. However, flowability of the plastic crystal matrix electrolyte is disadvantageous in terms of mechanical properties. For the purpose of improving this disadvantage, the crosslinked polymer structure is introduced into the plastic crystal matrix electrolyte.

The crosslinked polymer structure has a three-dimensional structure due to the chemical bonding between the molecular chains, unlike linear polymers. This three-dimensional structure compensates for the flowability of the plastic crystal matrix electrolyte. In addition, since this crosslinking protects the crosslinked polymer structure from thermal deformation, the electrolyte of the present disclosure does not soften even when heat is applied thereto, ensuring thermal stability of the electrolyte.

The electrolyte of the present disclosure is a composite of the ionic salt-doped plastic crystal matrix electrolyte and the crosslinked polymer structure. The composite may be prepared by homogenizing a monomer having two or more crosslinkable functional groups and the ionic salt-doped plastic crystal matrix electrolyte, and polymerizing the monomer to form the crosslinked polymer structure. Alternatively, the composite may be prepared by homogenizing a monomer having two or more crosslinkable functional groups, a monomer having one function group and the ionic salt-doped plastic crystal matrix electrolyte, and polymerizing the monomers to form the crosslinked polymer structure. The crosslinked polymer structure contributes to an improvement in the mechanical properties of the electrolyte to impart the electrolyte with mechanical properties comparable to that of a solid electrolyte. The uniform distribution of the plastic crystal matrix electrolyte increases the ionic conductivity of the electrolyte.

The weight ratio of the ionic salt-doped plastic crystal matrix electrolyte to the crosslinked polymer structure may be from 30:70 to 90:10.

It is preferred that the crosslinked polymer structure be obtained by polymerization of the monomer having two or more functional groups or by copolymerization of the monomer having two or more functional groups and the monomer having one functional group. The monomer having two or more functional groups and the monomer having one functional group are intended to include not only monomers but also polymers with a low degree of polymerization consisting of 2 to 20 repeating units.

The kind of the monomer having two or more functional groups is not limited. For example, the monomer having two or more functional groups may be selected from trimethylolpropane ethoxylate triacrylate, ethylene glycol dimethacrylate, ethylene glycol diacrylate, trimethylolpropane trimethacrylate, ethoxylated bisphenol A dimethacrylate and divinyl benzene.

The kind of the monomer having one functional group is not limited. For example, the monomer having one functional group may be selected from methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride, and vinyl fluoride.

There is no restriction on the kind of the plastic crystal matrix. Succinonitrile is preferably used as the plastic crystal matrix.

The ionic salt doping the plastic crystal matrix electrolyte is preferably a lithium salt. Examples of such lithium salts include lithium bis-trifluoromethanesulfonylimide, lithium bis-perfluoroethylsulfonylimide and lithium tetrafluoroborate.

The present disclosure also provides a method for preparing the electrolyte. Specifically, the electrolyte of the present disclosure is prepared by the following procedure.

First, a plastic crystal matrix electrolyte doped with an ionic salt is mixed with a monomer having two or more functional groups to prepare a solution (S1).

A monomer having one functional group may be optionally further added to the solution.

Alternatively, an ionic salt, a plastic crystal matrix and a monomer having two or more crosslinkable functional groups may be mixed to prepare a solution. In this case, there is no need to previously prepare the ionic salt-doped plastic crystal matrix electrolyte.

The weight ratio of the crosslinked polymer structure to the monomer may be from 30:70 to 90:10.

The monomer having two or more crosslinkable functional groups and the monomer having one functional group are intended to include not only monomers but also polymers with a low degree of polymerization consisting of 2 to 20 repeating units. The monomers may be selected from above-mentioned monomers. The plastic crystal matrix electrolyte may be any of the above-mentioned plastic crystal matrix electrolytes. The ionic salt may be any of the above-mentioned ionic salts. The ionic salt may be used in an amount of 0.1 to 3 mole % per the plastic crystal matrix.

A solvent may be added during mixing. In this case, drying is additionally needed to remove the solvent. However, the use of the solvent is not necessarily required. A photoinitiator, such as benzoin, may be optionally added to polymerize the monomer.

Subsequently, the monomer having two or more functional groups in the solution is polymerized to prepare the solid electrolyte (S2).

There is no particular restriction on the polymerization method. For example, the monomer may be polymerized by UV irradiation. The presence of two or more functional groups in the monomer allows the polymer to have a three-dimensional crosslinked structure.

The present disclosure also provides an electrochemical device including a cathode, an anode and the solid electrolyte. The electrochemical device of the present disclosure includes all devices in which electrochemical reactions occur. Specific examples of such electrochemical devices include all kinds of primary batteries, secondary batteries, fuel cells, solar cells, and capacitors such as supercapacitor devices. Particularly preferred are lithium secondary batteries, including lithium metal secondary batteries, lithium ion secondary batteries, lithium polymer secondary batteries and lithium ion polymer secondary batteries.

Particularly, the solid electrolyte of the present disclosure is injected into an electrode assembly consisting of a cathode, an anode and a separator interposed between the electrodes to fabricate a lithium secondary battery. The cathode, the anode and the separator constituting the electrode assembly may be those that are commonly used in the fabrication of lithium secondary batteries. The electrolyte of the present disclosure may replace the use of the separator because it is in the form of a solid.

Each of the cathode and the anode is composed of an electrode current collector and an electrode active material. A lithium-containing transition metal oxide is preferably used as an active material of the cathode. Specifically, the cathode active material may be selected from the group consisting of $LiCoO_2$, $LiNiO_2$, $LiMnO_2$, $Li_2Mn_2O_4$, $Li(Ni_aCo_bMn_c)O_2$ ($0<a<1, 0<b<1, 0<c<1, a+b+c=1$), $LiNi_{1-y}Co_yO_2$, $LiCo_{1-y}M-n_yO_2$, $LiNi_{1-y}Mn_yO_2$ ($0<y<1$), $Li(Ni_aCo_bMn_c)O_4$ ($0<a<2, 0<b<2, 0<c<2, a+b+c=2$), $LiMn_{2-z}Ni_zO_4$, $LiMn_{2-z}Co_zO_4$ ($0<z<2$), $LiCoPO_4$, $LiFePO_4$, and mixtures of two or more thereof. Other examples include sulfides, selenides and halides. The anode active material may be one capable of intercalating/deintercalating lithium ions. Examples of such anode active materials include carbon materials, lithium-containing titanium composite oxides (LTO); metals (Me), such as Si, Sn, Li, Zn, Mg, Cd, Ce, Ni and Fe; alloys of the metals (Me); oxides of the metals (Me) (MeOx); and composites of the metals (Me) and carbon. Carbon materials are preferred. Low-crystalline carbon materials and high-crystalline carbon materials can be used. Representative examples of low-crystalline carbon materials are soft carbon and hard carbon. Representative examples of high-crystalline carbon materials are natural graphite, Kish graphite, pyrolytic carbon, mesophase pitch based carbon fiber, meso-carbon microbeads, mesophase pitches, and high-temperature sintered carbon materials, such as petroleum or coal tar pitch derived cokes. The anode may include a binding agent. The binding agent may be selected from various kinds of binder polymers, such as vinylidene fluoride-hexafluoropropylene copolymers (PVDF-co-HFP), polyvinylidene fluoride, polyacrylonitrile and polymethylmethacrylate.

The separator may be a porous polymer film that is commonly used in separators for lithium secondary batteries. Examples of materials for the porous polymer film include polyolefin polymers, such as ethylene homopolymers, propylene homopolymers, ethylene/butane copolymers, ethylene/hexane copolymers and ethylene/methacrylate copolymers. The separator may be a laminate of two or more porous polymer films. The separator may be a porous non-woven fabric. Examples of materials for the porous non-woven fabric include, but are not limited to, high melting-point glass fiber and polyethylene terephthalate fiber.

The shape of the lithium secondary battery according to the present disclosure is not particularly limited. The lithium secondary battery of the present disclosure may have a cylindrical or prismatic shape depending on the shape of a can it uses. The lithium secondary battery of the present disclosure may be of pouch or coin type. A cable type having a linear structure, such as a wire, is also possible.

Hereinafter, preferred embodiments of the present disclosure will be described in detail. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

EXAMPLES

Example 1

Preparation of Crosslinked Polymer Structure/Plastic Crystal (15/85) Electrolyte Lithium bis-trifluoromethanesulfonylimide was added to succinonitrile to prepare a 1 M plastic crystal electrolyte. Trimethylolpropane ethoxylate triacrylate (TMPEOTA) and the plastic crystal electrolyte were homogenized in a weight ratio of 15:85. Benzoin as a UV initiator, in an amount of 3 wt %, was added to the mixture, based on the weight of the TMPEOTA.

Thereafter, the resulting mixture was cast on a glass plate and irradiated with UV for 20 sec. As a result of the polymerization, an electrolyte was produced in the form of a membrane.

Example 2

Preparation of Crosslinked Polymer Structure/Plastic Crystal (30/70) Electrolyte An electrolyte membrane was produced in the same manner as in Example 1, except that the mixing ratio of trimethylolpropane ethoxylate triacrylate (TMPEOTA) and the plastic crystal electrolyte were mixed in a weight ratio of 30:70.

Example 3

Preparation of Crosslinked Polymer Structure/Plastic Crystal (50/50) Electrolyte An electrolyte membrane was produced in the same manner as in Example 1, except that the mixing ratio of trimethylolpropane ethoxylate triacrylate (TMPEOTA) and the plastic crystal electrolyte were mixed in a weight ratio of 50:50.

Comparative Example 1

Preparation of Pure Plastic Crystal Matrix Electrolyte

Lithium bis-trifluoromethanesulfonylimide was added to succinonitrile to prepare a 1 M plastic crystal matrix electrolyte in a pure form.

Comparative Example 2

Preparation of Linear Polymer Matrix Crystal Electrolyte

Lithium bis-trifluoromethanesulfonylimide was added to succinonitrile to prepare a 1 M plastic crystal electrolyte. PVdF-HFP and the plastic crystal electrolyte in a weight ratio of 15:85 were homogenized in acetone as a solvent. The solvent was used in an amount of 20 wt %, based on the total weight of the mixture.

After the mixture was cast on a glass plate, the solvent was removed by evaporation in a glove box under an argon gas atmosphere to prepare an electrolyte membrane in the form of a solid.

Fabrication Example 1

Fabrication of Half Cell

Each of the electrolyte membranes produced in Examples 1-3 was inserted between tin-plated copper as a working electrode and lithium metal as a counter electrode to fabricate a coin-type half cell.

Comparative Fabrication Example 1

Fabrication of Half Cell

A polyethylene separator was interposed between tin-plated copper as a working electrode and lithium metal as a counter electrode to construct an electrode assembly. Thereafter, an electrolyte solution of 1 M $LiPF_6$ in a mixture of ethylene carbonate and diethyl carbonate (1:2, v/v) as non-aqueous solvents was injected into the electrode assembly to fabricate a coin-type half cell.

Test Example 1

Measurement of Electrochemical Stability

The electrolytes prepared in Example 1 and Comparative Example 2 were measured for electrochemical stability. The results are shown in FIG. 1. For the measurement, each of the electrolyte membranes produced in Example 1 and Comparative Example 2 was inserted between stainless steel as a working electrode and lithium metal as a counter electrode to fabricate a coin-type half cell. The electrochemical stability of the coin-type half cell was measured with increasing voltage to 6 V at a scan rate of 5 mV/s by linear sweep voltammetry (LSV).

As can be seen from FIG. 1, the electrolyte of Example 1 including the crosslinked polymer structure and the plastic crystal electrolyte shows improved electrochemical stability, compared to the electrolyte of Comparative Example 2 including the linear polymer matrix. Particularly, the electrolyte of Example 1 is electrochemically stable up to 5 V.

Test Example 2

Measurement of Ionic Conductivities Depending on the Content of Crosslinked Polymer Structure The ionic conductivities of the electrolytes of Examples 1-3 having different contents of the crosslinked polymer structure were measured. The results are shown in Table 1.

TABLE 1

| Plastic crystal solid electrolyte | Ionic conductivity (25° C., S/cm) |
| --- | --- |
| Example 1 | $2.4 \times 10^{-3}$ |
| Example 2 | $2.3 \times 10^{-4}$ |
| Example 3 | $5.1 \times 10^{-5}$ |

Test Example 3

Measurement of Ionic Conductivities with Varying Temperatures

The ionic conductivities of the electrolytes of Example 1 and Comparative Examples 1-2 were measured with increasing temperature from 30° C. to 70° C. The results are shown in FIG. 2.

Figure 2:
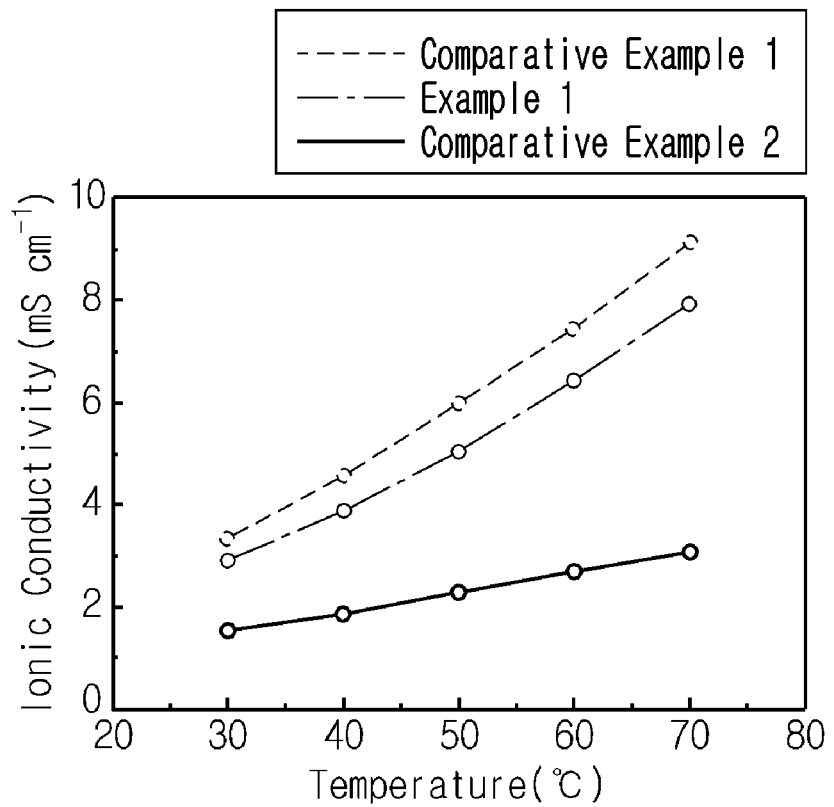
FIG. 2 is a graph showing the ionic conductivities of electrolytes prepared in Example 1 and Comparative Examples 1-2 with varying temperatures.

As can be seen from FIG. 2, the ionic conductivities of the electrolytes increase in proportion to the temperature. Particularly, the ionic conductivity of the electrolyte of Example 1 including the crosslinked polymer structure is slightly lower than that of the linear polymer matrix plastic crystal electrolyte of Comparative Example 2 but is higher than that of the pure plastic crystal electrolyte of Comparative Example 1.

Test Example 4

Measurement of Mechanical Properties

Figure 3:
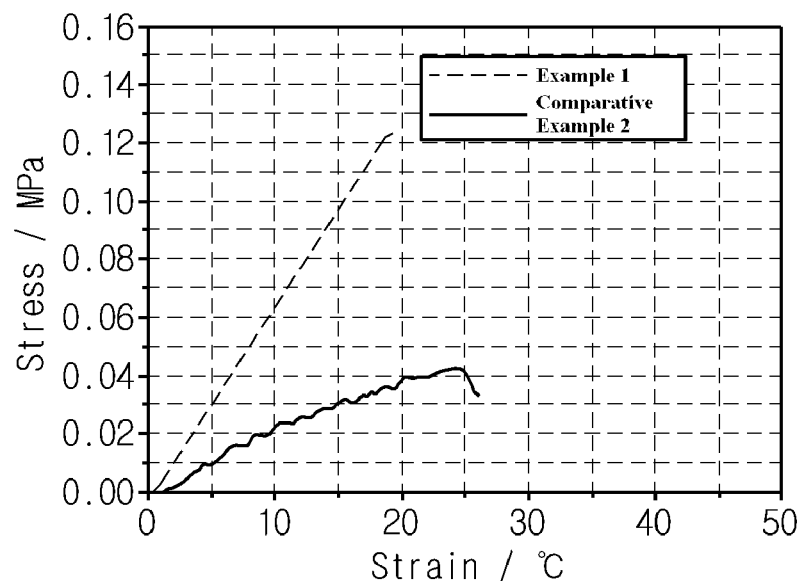
FIG. 3 is a graph showing the tensile strengths of electrolytes prepared in Example 1 and Comparative Example 2.

The tensile strengths of the electrolytes prepared in Example 1 and Comparative Example 2 were measured. The results are shown in FIG. 3. Referring to FIG. 3, the electrolyte of Example 1 including the crosslinked polymer structure shows greatly improved physical properties compared to the polymer matrix plastic crystal electrolyte of Comparative Example 2.

Test Example 5

Charge-Discharge Tests on Half Cells

Figure 4:
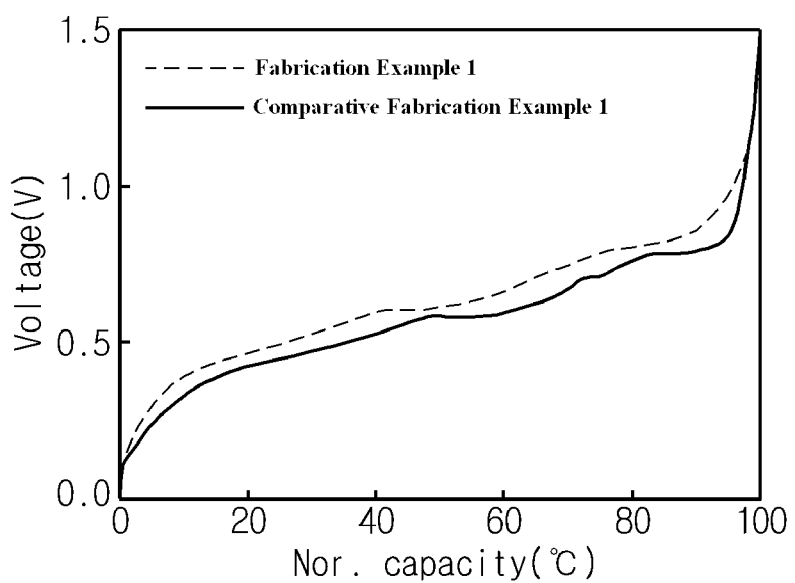
FIG. 4 is a graph showing the performance of half cells fabricated in Fabrication Example 1 and Comparative Fabrication Example 1.

Each of the half cells fabricated in Fabrication Example 1 and Comparative Fabrication Example 1 was charged to 5 mV with a current density of 0.5 C under constant current conditions and maintained at a constant voltage of 5 mV. The charging was stopped when the current density reached 0.005 C. The half cell was discharged to 1.5 V with a current density of 0.1 C in a CC mode. Charge and discharge cycles were repeated under the same conditions. The normalized graph is shown in FIG. 4.

The half cell of Fabrication Example 1 has a slightly higher resistance than the half cell of Comparative Fabrication Example 1 including the liquid electrolyte solution and the separator, but its performance is comparable to that of general half cells.

What is claimed is:

1. A method for preparing a solid electrolyte comprising a composite of a composite of a plastic crystal matrix electrolyte doped with an ionic salt and a crosslinked polymer structure, the method comprising:
   (S1) mixing the plastic crystal matrix electrolyte doped with the ionic salt and a monomer having two or more crosslinkable functional groups to prepare a solution; and
   (S2) polymerizing only the monomer of the solution to form the crosslinked polymer structure in the presence of the plastic crystal matrix electrolyte.

2. The method according to claim 1, wherein the ionic salt-doped plastic crystal matrix electrolyte and the monomer are used in a weight ratio of 30:70 to 90:10.

3. The method according to claim 1, wherein the plastic crystal matrix electrolyte comprises succinonitrile.

4. The method according to claim 1, wherein the ionic salt is used in an amount of 0.1 to 3 moles per mole of the plastic crystal matrix electrolyte.

5. The method according to claim 1, wherein the ionic salt is a lithium salt.

6. The method according to claim 5, wherein the lithium salt is selected from lithium bis-trifluoromethanesulfonylimide, lithium bis-perfluoroethylsulfonylimide, lithium tetrafluoroborate, and mixtures thereof.

7. The method according to claim 1, wherein the monomer having two or more functional groups is selected from trimethylolpropane ethoxylate triacrylate, ethylene glycol dimethacrylate, trimethylolpropane trimethacrylate, ethoxylated bisphenol A dimethacrylate, ethylene glycol diacrylate, and mixtures thereof.

* * * * *